(12) United States Patent
Balenda, II

(10) Patent No.: US 10,663,052 B2
(45) Date of Patent: May 26, 2020

(54) VEHICLE DRIVELINE HAVING A VEHICLE DRIVELINE COMPONENT WITH A DUAL DISCONNECTING DIFFERENTIAL

(71) Applicant: AMERICAN AXLE & MANUFACTURING, INC., Detroit, MI (US)

(72) Inventor: Joseph S. Balenda, II, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 43 days.

(21) Appl. No.: 16/108,116

(22) Filed: Aug. 22, 2018

(65) Prior Publication Data

US 2020/0063845 A1 Feb. 27, 2020

(51) Int. Cl.
   *F16H 48/24* (2006.01)
   *B60K 17/16* (2006.01)
   *B60K 17/346* (2006.01)
   *B60K 23/08* (2006.01)
   *F16H 48/08* (2006.01)
   *F16H 48/40* (2012.01)

(52) U.S. Cl.
   CPC ............ *F16H 48/24* (2013.01); *B60K 17/165* (2013.01); *B60K 17/3462* (2013.01); *B60K 23/08* (2013.01); *F16H 48/08* (2013.01); *F16H 48/40* (2013.01); *B60K 2023/0825* (2013.01)

(58) Field of Classification Search
   None
   See application file for complete search history.

(56) References Cited

U.S. PATENT DOCUMENTS

| | | | |
|---|---|---|---|
| 5,007,886 A | 4/1991 | Holmquist et al. | |
| 5,056,614 A * | 10/1991 | Tokushima | B60K 23/0808 180/248 |
| 5,135,071 A * | 8/1992 | Shibahata | B60K 17/348 180/245 |
| 5,141,072 A * | 8/1992 | Shibahata | B60K 17/35 180/245 |
| 6,537,172 B1 | 3/2003 | McAuliffe, Jr. et al. | |
| 6,796,412 B2 * | 9/2004 | Teraoka | F16H 48/22 192/35 |
| 7,247,118 B2 * | 7/2007 | Haruki | F16H 48/08 335/279 |
| 7,264,569 B2 | 9/2007 | Fox | |
| 7,602,271 B2 | 10/2009 | York et al. | |
| 8,042,642 B2 | 10/2011 | Marsh et al. | |
| 8,313,407 B2 * | 11/2012 | Ekonen | B60K 23/0808 180/245 |

(Continued)

*Primary Examiner* — Dirk Wright
(74) *Attorney, Agent, or Firm* — Burris Law, PLLC

(57) ABSTRACT

A vehicle driveline component having a differential input, which is rotatable about a differential axis, a differential gearset that is driven by the differential input, first and second differential outputs, which are rotatable about the differential axis, a first disconnect clutch and a second disconnect clutch. The differential gearset has a first gearset output and a second gearset output that are rotatable about the differential axis. The first disconnect clutch selectively couples the first differential output to the first gearset output, while the second disconnect clutch selectively couples the second differential output to the second gearset output.

20 Claims, 10 Drawing Sheets

(56) References Cited

U.S. PATENT DOCUMENTS

| | | | |
|---|---|---|---|
| 8,534,409 B2* | 9/2013 | Sigmund | B60K 23/0808 |
| | | | 180/247 |
| 8,591,375 B2* | 11/2013 | Maruyama | F16D 27/118 |
| | | | 192/84.92 |
| 8,608,611 B2* | 12/2013 | Ekonen | B60K 17/35 |
| | | | 475/221 |
| 8,721,493 B2* | 5/2014 | Burgbacher | B60K 17/35 |
| | | | 475/223 |
| 8,926,471 B2* | 1/2015 | Yamanaka | F16H 48/22 |
| | | | 475/331 |
| 9,193,263 B2* | 11/2015 | Ekonen | B60K 17/35 |
| 9,481,243 B2* | 11/2016 | Larkin | B60K 23/08 |
| 9,500,268 B2 | 11/2016 | Balenda, II | |
| 2010/0041506 A1* | 2/2010 | Cooper | F16H 48/08 |
| | | | 475/223 |
| 2010/0094519 A1* | 4/2010 | Quehenberger | B60K 17/3515 |
| | | | 701/69 |
| 2018/0029471 A1 | 2/2018 | Richards et al. | |
| 2019/0078676 A1* | 3/2019 | Komatsu | F16H 48/34 |

\* cited by examiner

US 10,663,052 B2

VEHICLE DRIVELINE HAVING A VEHICLE DRIVELINE COMPONENT WITH A DUAL DISCONNECTING DIFFERENTIAL

FIELD

The present disclosure relates to vehicle driveline having a vehicle driveline component with a dual disconnecting differential.

BACKGROUND

Vehicles having a disconnecting driveline are increasingly common in modern vehicles. Disconnecting all-wheel drive drivelines, for example, provide all-wheel drive capabilities in some situations where additional traction needed, but may be disconnected to permit the driveline to be operated in a two-wheel drive mode for increased fuel economy. Disconnecting all-wheel drive drivelines typically include a primary axle, which is typically the front axle, a secondary axle, and a power take-off unit, which that can transmit power between the primary and secondary axle, a first disconnect clutch, which can selectively interrupt power transmission between the power take-off unit and the secondary axle, and one or more second disconnect clutches, which can selectively interrupt power transmission between the secondary axle and one or more of the vehicle wheels that are driven by the secondary axle.

Certain disconnecting driveline configurations, such as those having a secondary axle that selectively disconnects one wheel from one of the outputs of a differential assembly in the secondary axle, provide a torque transmission path between the non-disconnected wheel and the differential assembly that permits the gearing within the differential assembly to be "back driven" when the secondary axle is operated in the disconnected mode. Such configurations do not maximize the fuel efficiency that could be obtained through the disconnection of the secondary axle.

Other disconnecting driveline configurations that disconnect both of the wheels from the outputs of the differential assembly in the secondary axle, via multiple clutches or couplings, for example, are not entirely satisfactory in that they require multiple actuators and/or take up too much space. Consequently, there remains a need in the art for a disconnecting driveline having an improved disconnectable secondary axle in which both of the wheels driven by secondary axle can be disconnected from the differential assembly of the secondary axle.

SUMMARY

This section provides a general summary of the disclosure, and is not a comprehensive disclosure of its full scope or all of its features.

In one form, the present disclosure provides a vehicle driveline having a differential input, which is rotatable about a differential axis, a differential gearset that is driven by the differential input, first and second differential outputs, which are rotatable about the differential axis, a first disconnect clutch and a second disconnect clutch. The differential gearset has a first gearset output and a second gearset output that are rotatable about the differential axis. The first disconnect clutch selectively couples the first differential output to the first gearset output, while the second disconnect clutch selectively couples the second differential output to the second gearset output.

In another form, the present disclosure provides a vehicle driveline that includes a housing, an input pinion, a ring gear, a differential assembly and an actuator. The input pinion is received in the housing and is rotatable about a pinion axis. The ring gear is meshed with the input pinion and is rotatable about a differential axis that is transverse to the pinion axis. The differential assembly has a differential case, a plurality of differential pinions, first and second side gears, first and second output members, a first disconnect clutch and a second disconnect clutch. The differential case defines a cavity and is coupled to the ring gear for rotation therewith. The pinions are received in the cavity and are rotatably coupled to the differential case. The first and second side gears are received in the cavity and are meshingly engaged to the differential pinions. The first and second side gears are rotatable about the differential axis. The first output member is received in the chamber and disposed between a first axial end of the differential case and the first side gear. The second output member is received in the chamber and is disposed between a second, opposite axial end of the differential case and the second side gear. The first and second side gears are received between the first and second outputs. The first clutch has a first dog, which is fixedly coupled to the first side gear, a second dog, which is fixedly coupled to the first output, and a first biasing spring that biases the second dog along the differential axis away from the first dog. The second clutch has a third dog, which is non-rotatably but axially slidably coupled to the second side gear, a fourth dog, which is fixedly coupled to the second output, and a second biasing spring that biases the third dog along the differential axis away from the fourth dog. The actuator has an electromagnet, a plunger, a plurality of first pins, and a plurality of second pins. The electromagnet is rotatably disposed on an exterior surface of the differential case. The plunger is received on the exterior surface of the differential case and is disposed axially along the differential axis between the first axial end of the differential case and the electromagnet. The first pins extend through the first end of the differential case and are disposed in a first load transmission path between the plunger and the second dog. The second pins extend through the first end of the differential case radially outwardly of the first pins. The second pins are disposed in a second load transmission path between the plunger and the third dog. Operation of the electromagnet to move the plunger along the differential axis toward the first axial end of the differential case causes corresponding movement of the first and second pins to thereby engage the second dog to the first dog and to engage the third dog to the fourth dog.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
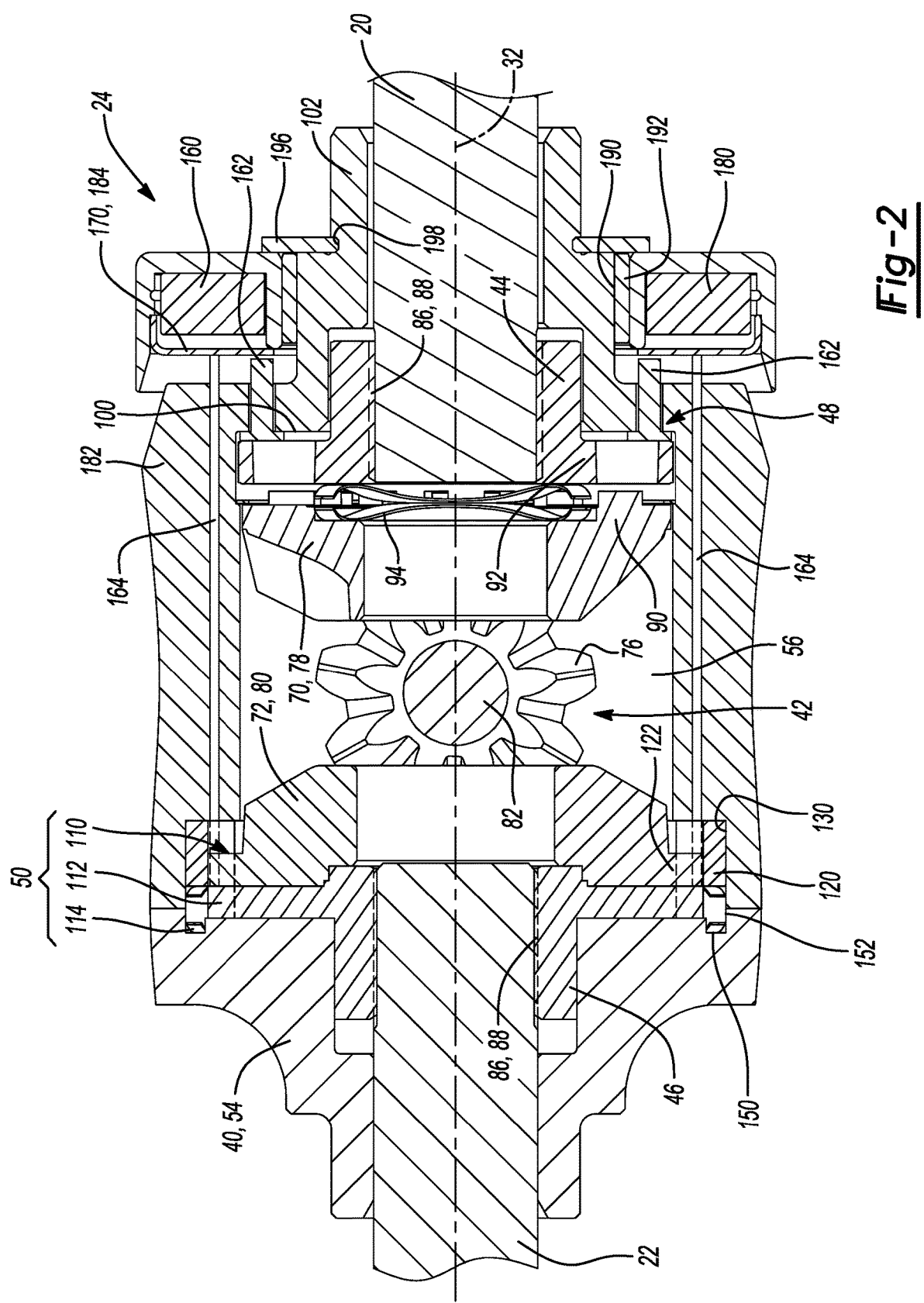
FIG. 2 is a longitudinal section view of a portion of the vehicle driveline component of FIG. 1, the view illustrating a disconnecting differential assembly in more detail with first and second disconnect clutches shown in disengaged conditions.
Figure 11:
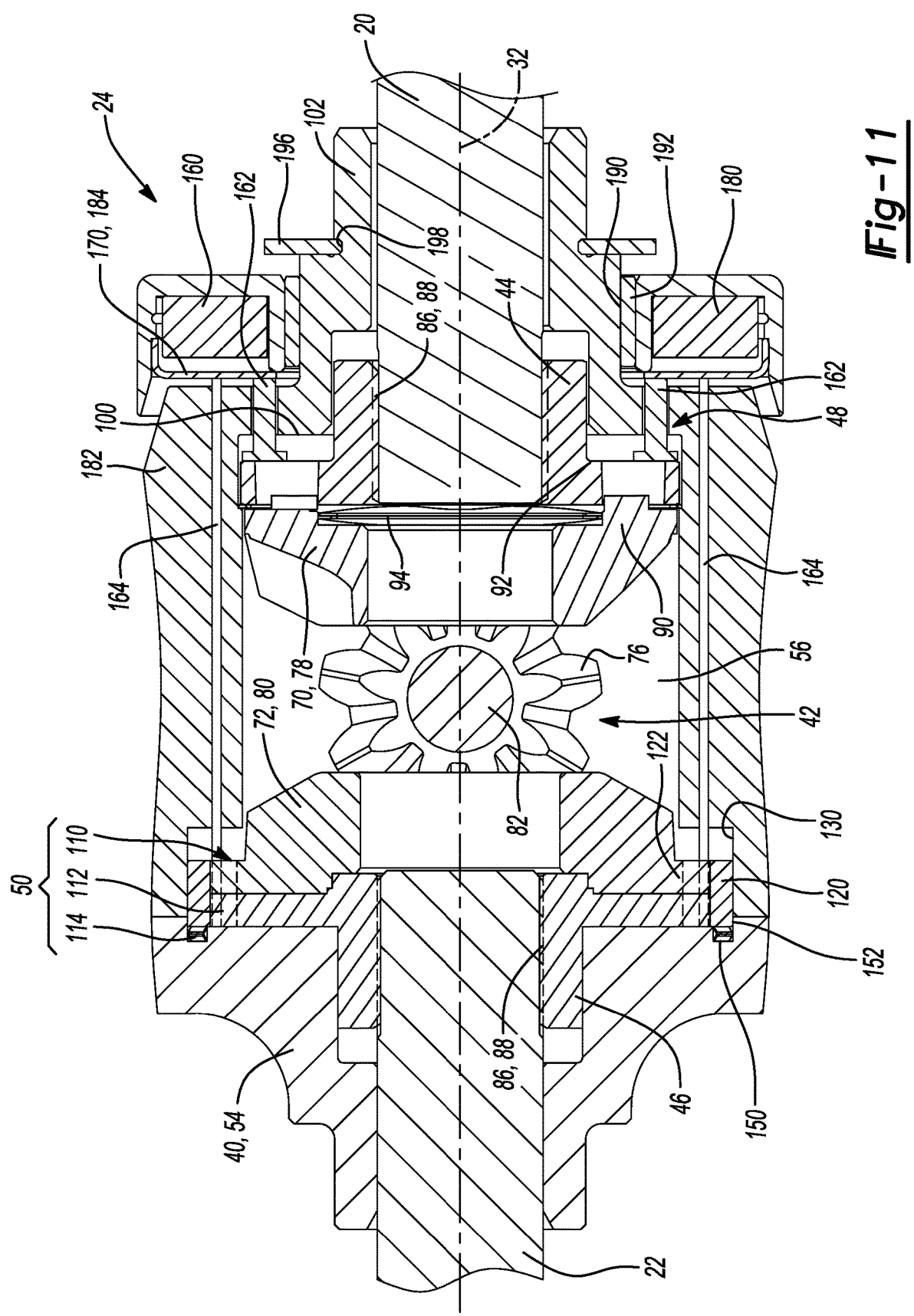
Figure 12:
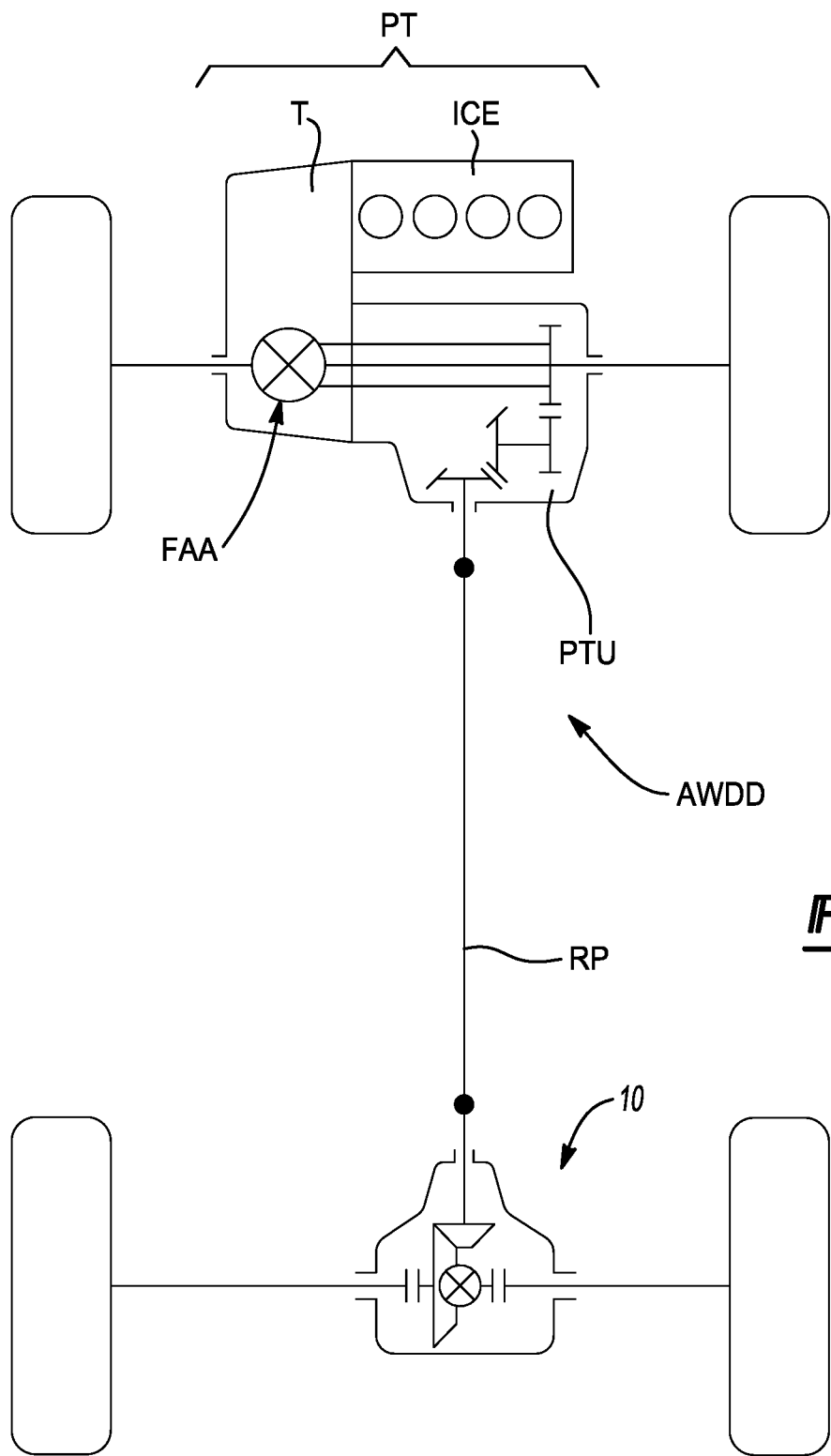
Figure 13:
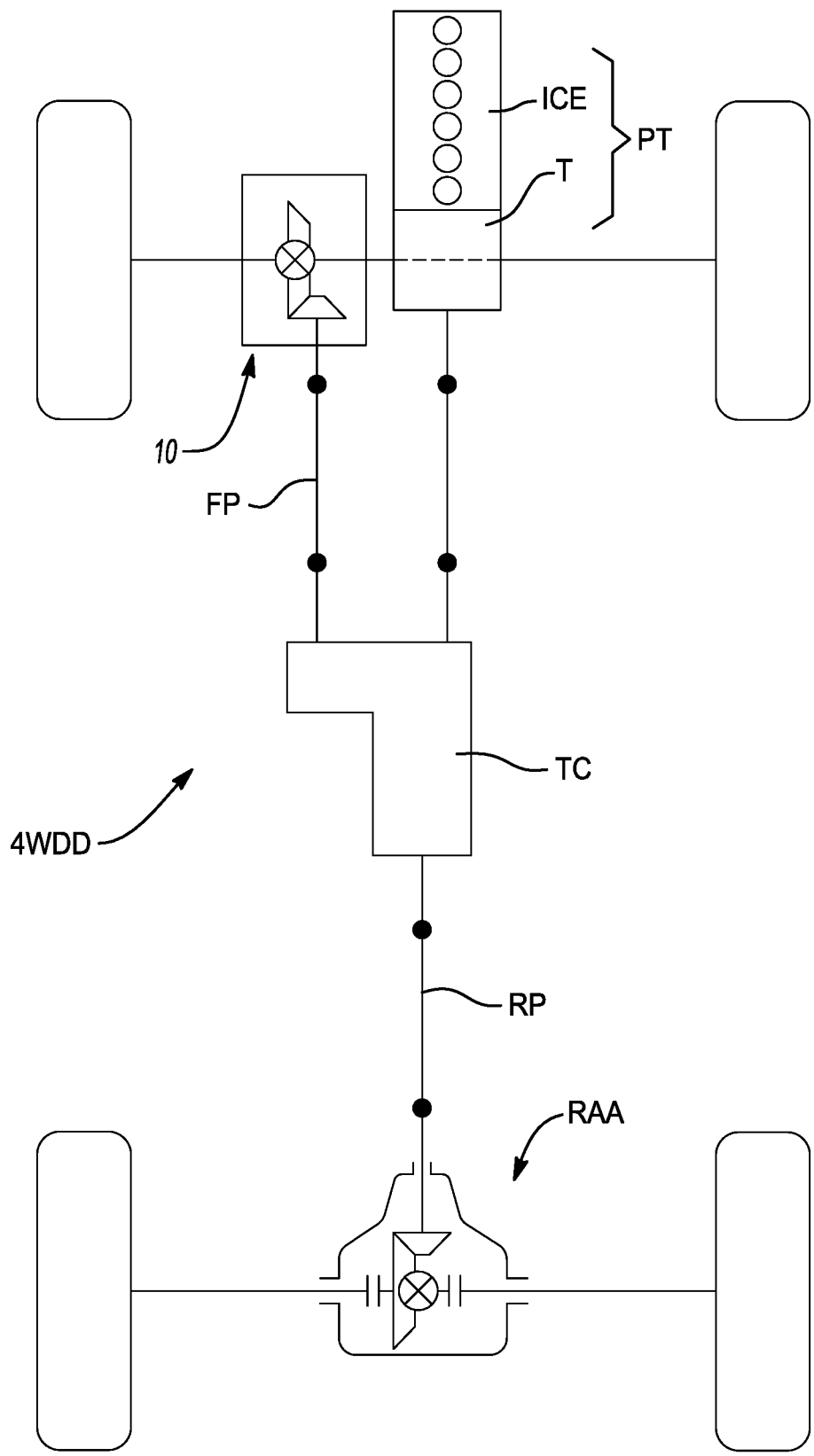

FIG. 11 is a section view similar to that of FIG. 2 but depicting the first and second disconnect clutches in the engaged conditions FIG. 12 is a schematic view of an exemplary all-wheel drive driveline in which a vehicle driveline component constructed in accordance with the teachings of the present disclosure is a rear axle assembly; and FIG. 13 is a schematic view of an exemplary four-wheel drive driveline in which a vehicle driveline component constructed in accordance with the teachings of the present disclosure is a front axle assembly.

Corresponding reference numerals indicate corresponding parts throughout the several views of the drawings.

DETAILED DESCRIPTION

Figure 1:
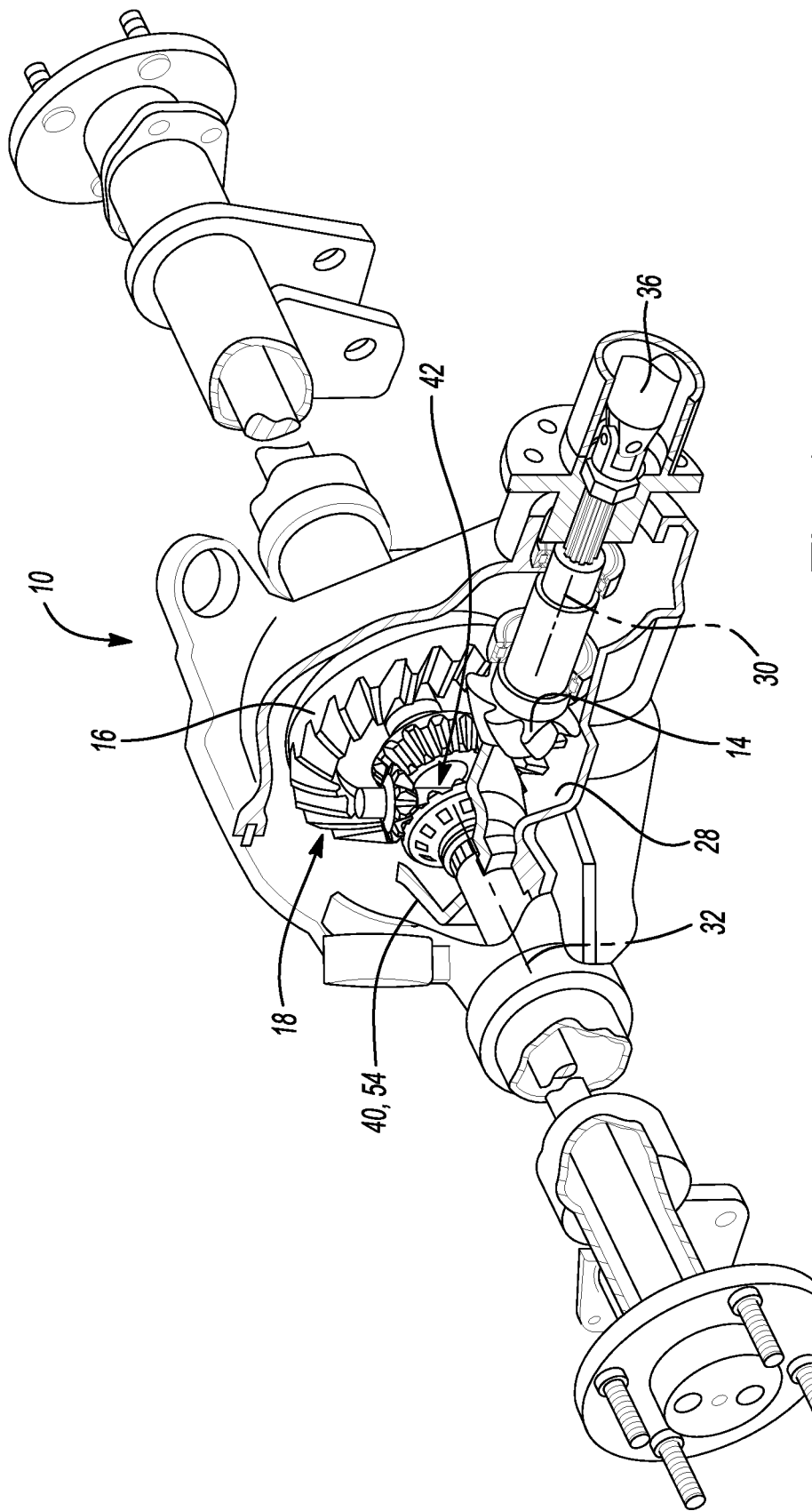
FIG. 1 is a partly broken away perspective view of an exemplary vehicle driveline component constructed in accordance with the teachings of the present disclosure.

With reference to FIG. 1, an exemplary vehicle driveline component constructed in accordance with the teachings of the present disclosure is generally indicated by reference numeral 10. In the particular example provided, the vehicle driveline component 10 is an axle assembly, but it will be appreciated that the vehicle driveline component could be configured differently. For example, the vehicle driveline component 10 could comprise a transfer case, a power take-off unit, or a center differential.

The vehicle driveline component 10 can include a housing 12, an input pinion 14, a ring gear 16, a (disconnecting) differential assembly 18, a first and second output shafts 20 and 22, respectively, and an actuator 24 (FIG. 2). The housing 12 defines a cavity 28 into which the input pinion 14, the ring gear 16 and the second differential assembly 18 are received. The input pinion 14 is supported by the housing 12 for rotation about a pinion axis 30. The ring gear 16 is meshed with the input pinion 14 and is rotatable about a differential axis 32 that is transverse to the pinion axis 30. The vehicle driveline component 10 is operable in a connected mode, in which rotary power received from a propshaft 36 is transmitted through the differential assembly 18 to drive a pair of drive wheels (not shown), and a disconnected mode in which the drive wheels are rotationally de-coupled from respective outputs of the differential assembly 18.

Figure 3:
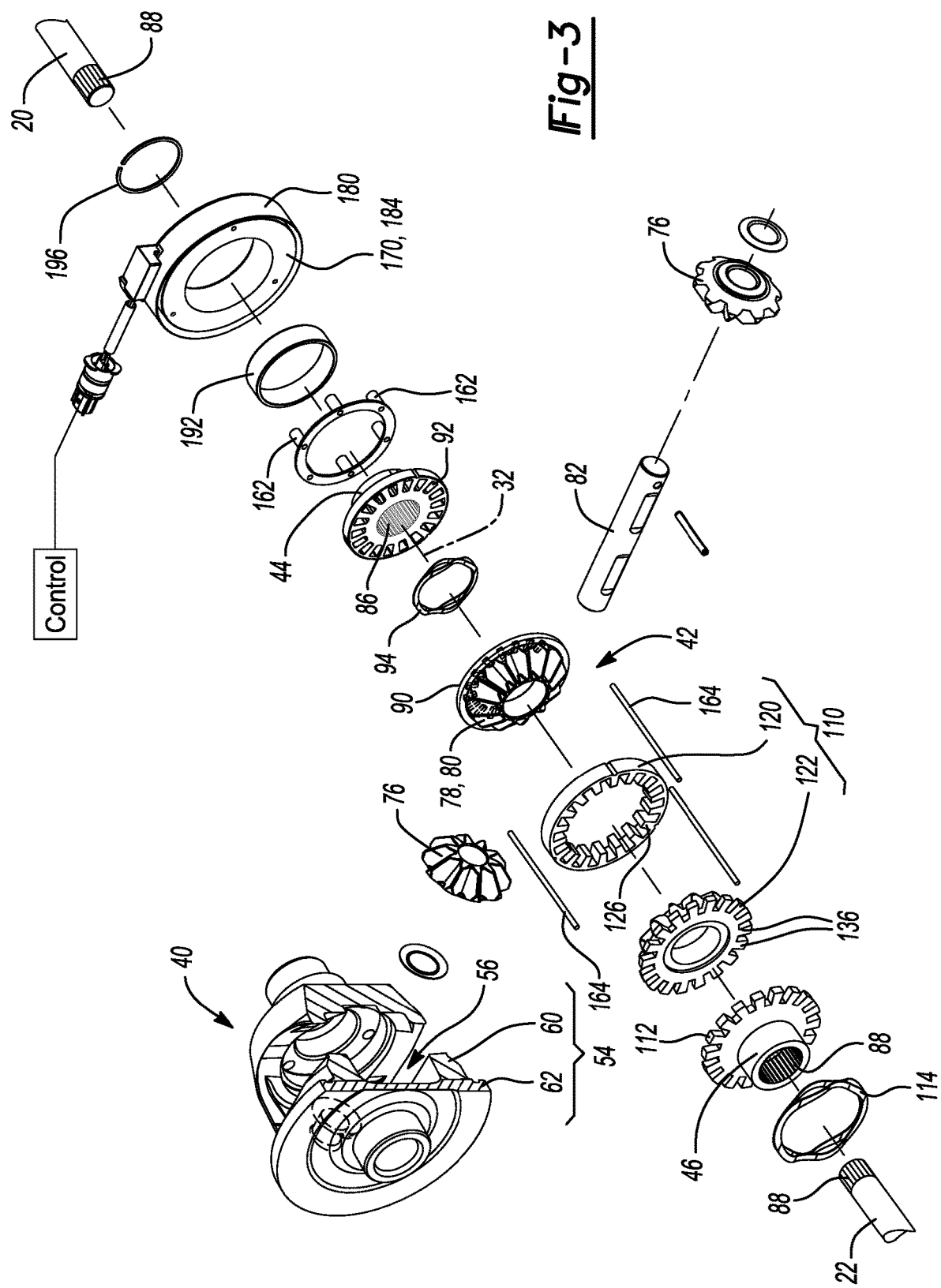
FIG. 3 is an exploded perspective view of the disconnecting differential assembly.

With reference to FIGS. 2 and 3, the differential assembly 18 can include a differential input 40, a differential gearset 42, first and second differential outputs 44 and 46, a first disconnect clutch 48 and a second disconnect clutch 50. The differential input 40 is coupled to the ring gear 16 for rotation about the differential axis 32 and is configured to input rotary power into the differential gearset 42.

With reference to FIGS. 2 and 3, the differential input 40 can be variously configured depending on the particular configuration differential gearset 42. For example, the differential input 40 could be an internal gear (not shown) formed into or coupled to the ring gear 16 (FIG. 1) if the differential gearset 42 were to have a spur planetary gear configuration. In the example provided, the differential input 40 is a differential case 54 that defines an internal case cavity 56. The differential case 54 is shown to have a two-piece configuration with a case member 60 and a cap 62 that is fixedly coupled to the case member 60. Construction in this manner can be advantageous for the assembly of the differential gearset 42 and the first and second disconnect clutches 48 and 50 into the case cavity 56, but it will be appreciated that the differential case 54 could be constructed differently.

The differential gearset 42 has first and second gearset outputs 70 and 72, respectively, that are rotatable about the differential axis 32. The differential gearset 42 could have any desired configuration, such as a spur planetary configuration (not shown), in which the first and second gearset outputs 70 and 72 could be a sun gear and a planet carrier or could be a pair of sun gears, a configuration that employs helical pinions and side gears (not shown), in which the first and second gearset outputs 70 and 72 are the side gears, or the configuration shown in which the differential gearset 42 includes differential pinions 76 and first and second side gears 78 and 80, respectively, having straight bevel gear teeth. The differential pinions 76 are coupled to the differential case 54 for rotation about respective pinion axes and are meshingly engaged with the first and second side gears 78 and 80. In the example shown, a quantity of two of the differential pinions 76 are employed, with the differential pinions 76 being rotatably mounted on a cross-pin 82 that is fixedly coupled to the differential case 54 so as to be perpendicular to the differential axis 32. Also in the example provided, the first side gear 78 is the first gearset output 70, while the second side gear 80 is the second gearset output 72.

The first and second differential outputs 44 and 46 can be sleeve-like structures having an internally splined aperture 86 into which a male splined segment 88 on an associated one of the first and second output shafts 20 and 22, respectively, can be received to thereby non-rotatably couple the first differential output 44 to the first output shaft 20 and non-rotatably couple the second differential output 46 to the second output shaft 22. The opposite ends of the first and second output shafts 20 and 22 can be drivingly coupled to respective ones of the drive wheels.

The first and second disconnect clutches 48 and 50 can be any type of clutch that can be received in the case cavity 56 to selectively couple the first and second gearset outputs 70 and 72 to the first and second differential outputs 44 and 46, respectively. In the particular example provided, each of the first and second disconnect clutches 48 and 50 is a dog clutch.

Figure 4:
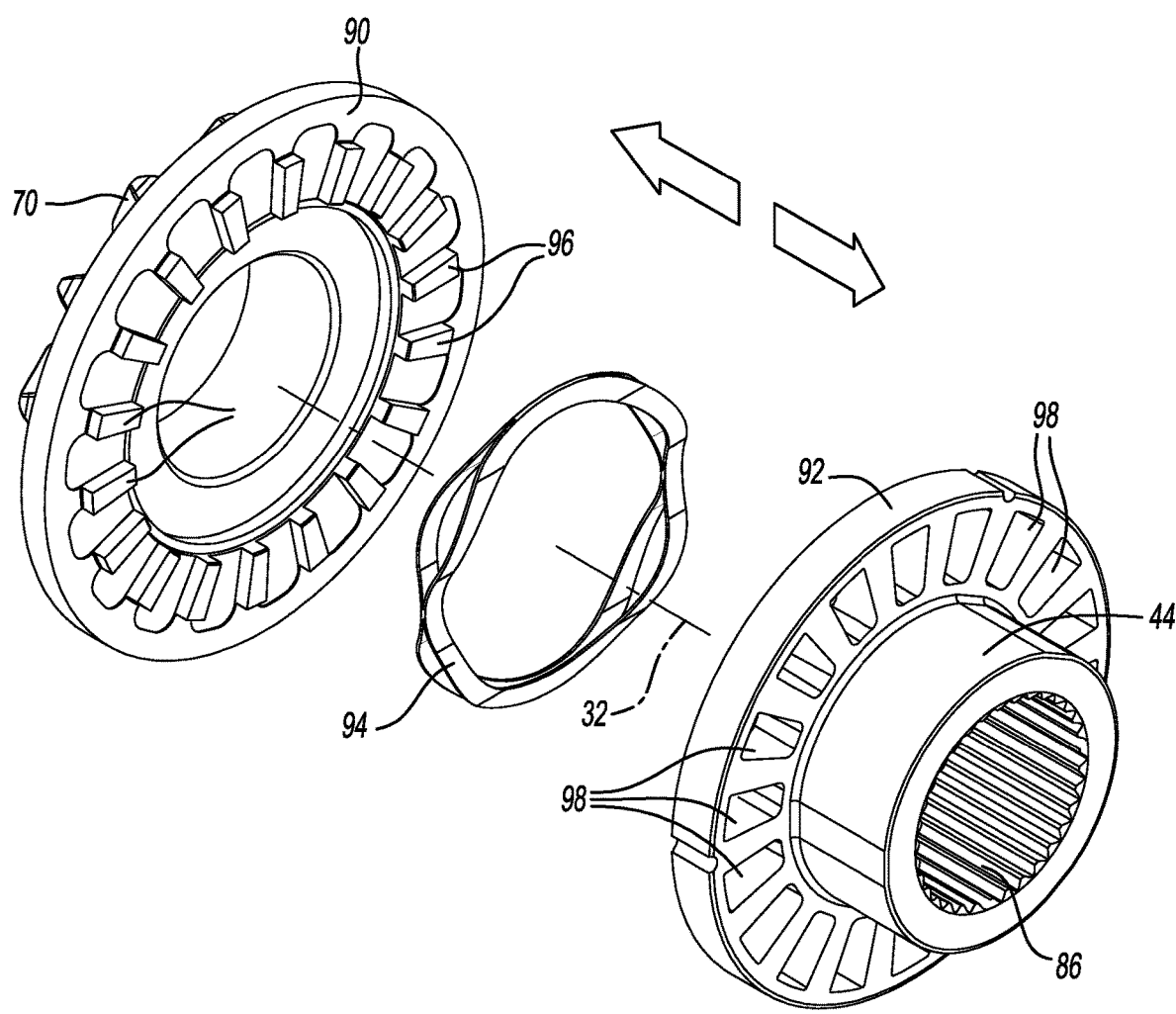
FIG. 4 is an exploded perspective view of a portion of the disconnecting differential assembly, the view illustrating a first disconnect clutch in more detail.

With reference to FIG. 4, the first disconnect clutch 48 can comprise a first dog 90, a second dog 92 and a first return spring 94. The first dog 90 can be fixedly coupled to the first gearset output 70 and can include a plurality of first engagement features 96, such as face teeth, that can project from the first gearset output 70 axially toward the second dog 92. The second dog 92 can be fixedly coupled to the first differential output 44 and can include a plurality of second engagement features 98 that are configured to matingly engage with the first engagement features 96 on the first dog 90. In the example provided, the second dog 92 is an annular flange that projects radially outwardly from the first differential output 44 and the second engagement features 98 comprise apertures in the annular flange. If desired, the first engagement features 96 could be formed with a predetermined amount of back-taper (e.g., 1.5 degrees per side), and/or the second engagement features 98 could be formed with a corresponding amount of positive taper (e.g., 1.5 degrees per side) to permit the first and second engagement features 96 and 98 to more readily engage one another. The first return spring 94 can be disposed between the first and second dogs 90 and 92 and can bias the second dog 92 (and the first differential output 44) along the differential axis 32 in a direction toward an interior surface 100 (FIG. 2) of a first axial end 102 (FIG. 2) of the differential case 54 (FIG. 2).

Returning to FIG. 3, the second disconnect clutch 50 can comprise a third dog 110, a fourth dog 112 and a second return spring 114. The third dog 110 can include a dog ring 120 and a dog member 122.

Figures 5, 6:
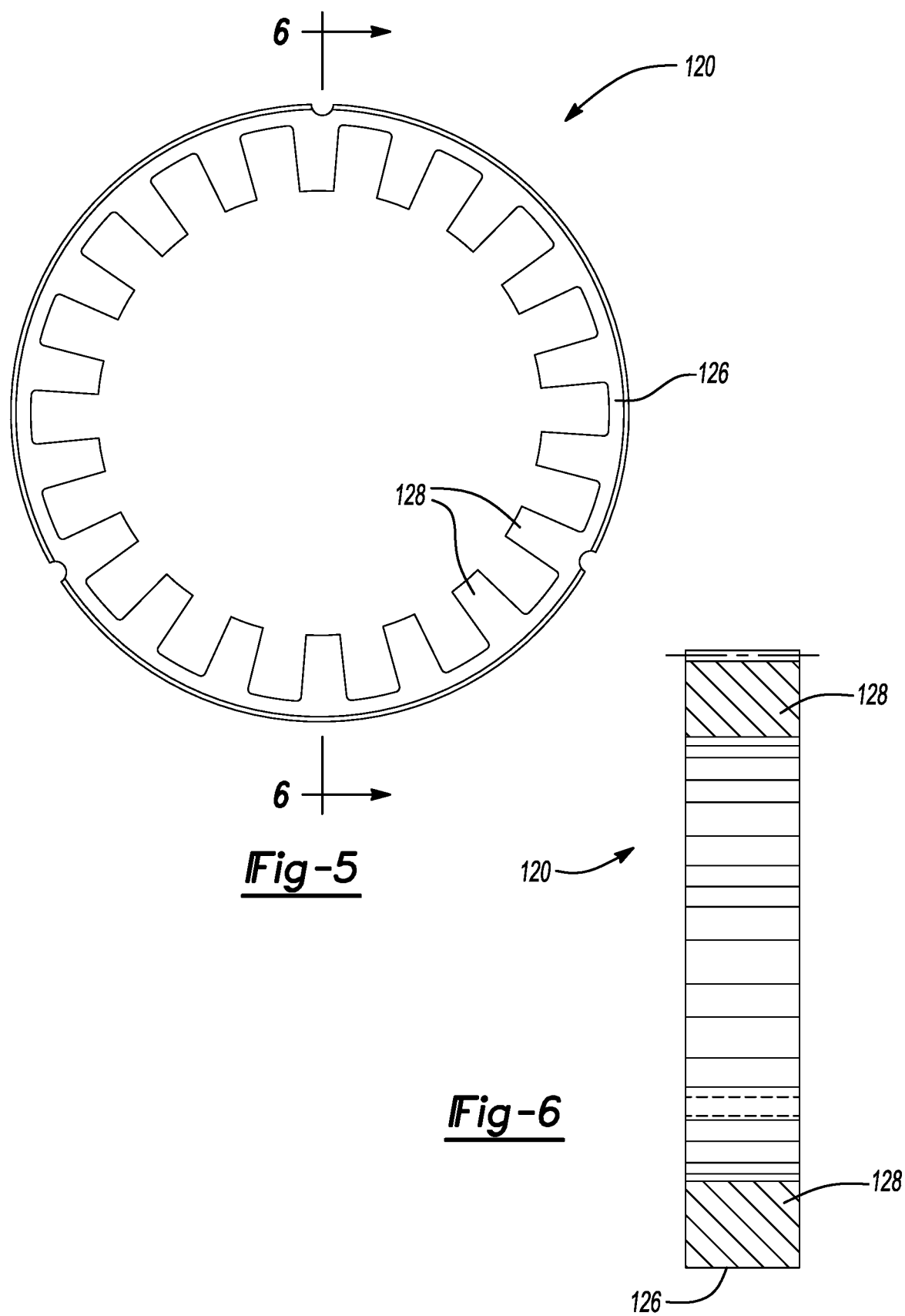
FIG. 5 is a side elevation view of a portion of the disconnecting differential assembly, the view illustrating a dog ring of a second disconnect clutch in more detail.
FIG. 6 is a section view taken along the line 6-6 of FIG. 5.

With reference to FIGS. 2, 5 and 6, the dog ring 120 can have an annular body 126 and a plurality of dog teeth 128 that are disposed about the circumference of the annular body 126 and which extend radially inwardly from the annular body 126. The dog ring 120 can be received into a counterbore 130 formed in the differential case 54 and can be translated along the differential axis 32 relative to the differential case 54.

Figure 7:
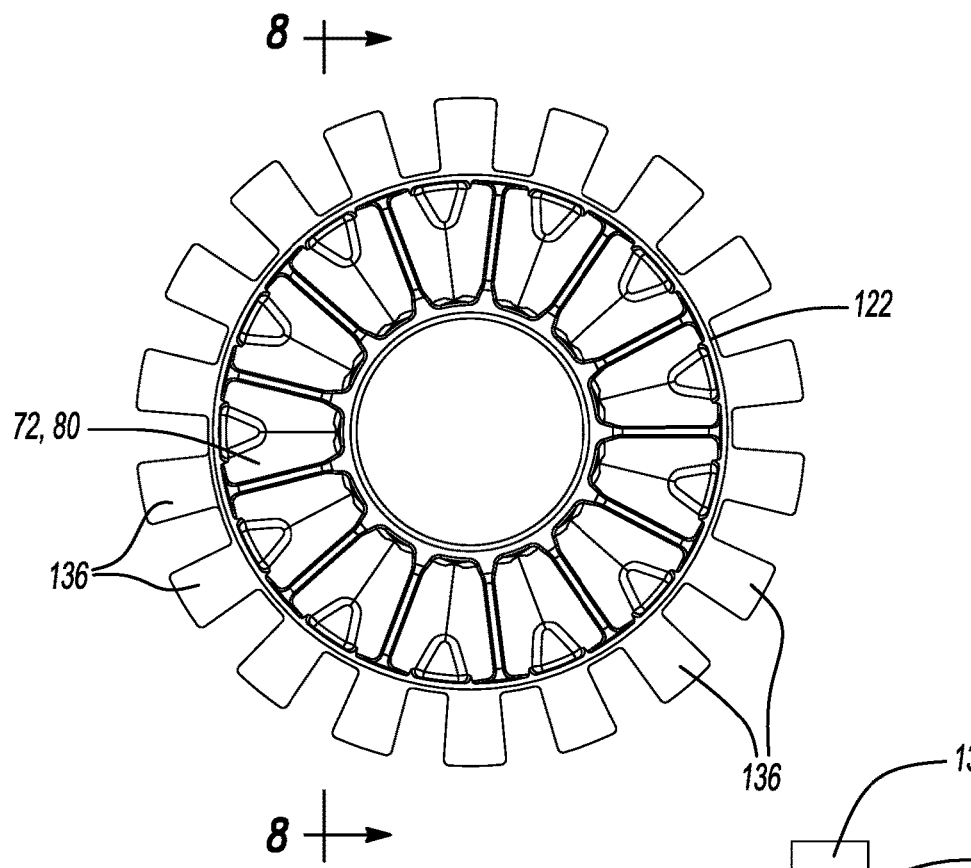
FIG. 7 is a side elevation view of a portion of the disconnecting differential assembly, the view illustrating a dog member of the second disconnect clutch and a gearset output of a differential gearset.
Figure 8:
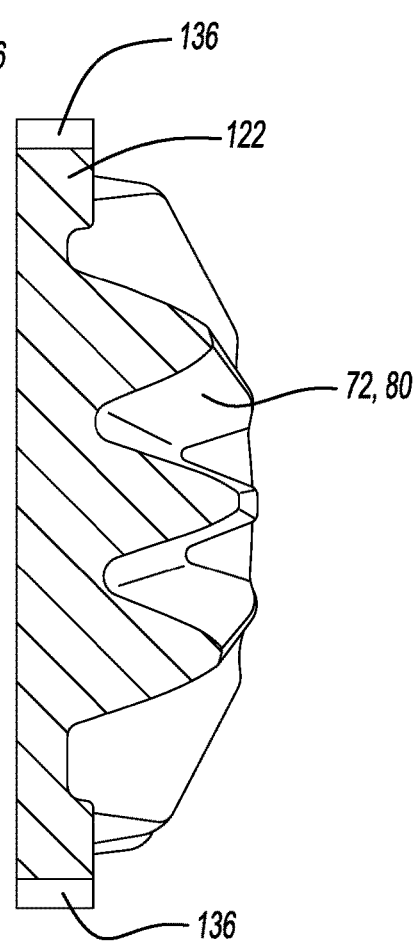
FIG. 8 is a section view taken along the line 8-8 of FIG. 7.

With reference to FIGS. 7 and 8, the dog member 122 can include first teeth 136 that are formed about the circumference of the second gearset output 72. With additional reference to FIGS. 2 and 5, the dog teeth 128 of the dog ring 120 can be meshed to and slidable on the first teeth 136 of the dog member 122. As such, the dog ring 120 and the dog member 122 are coupled to one another for common rotation about the differential axis 32.

Figure 9:
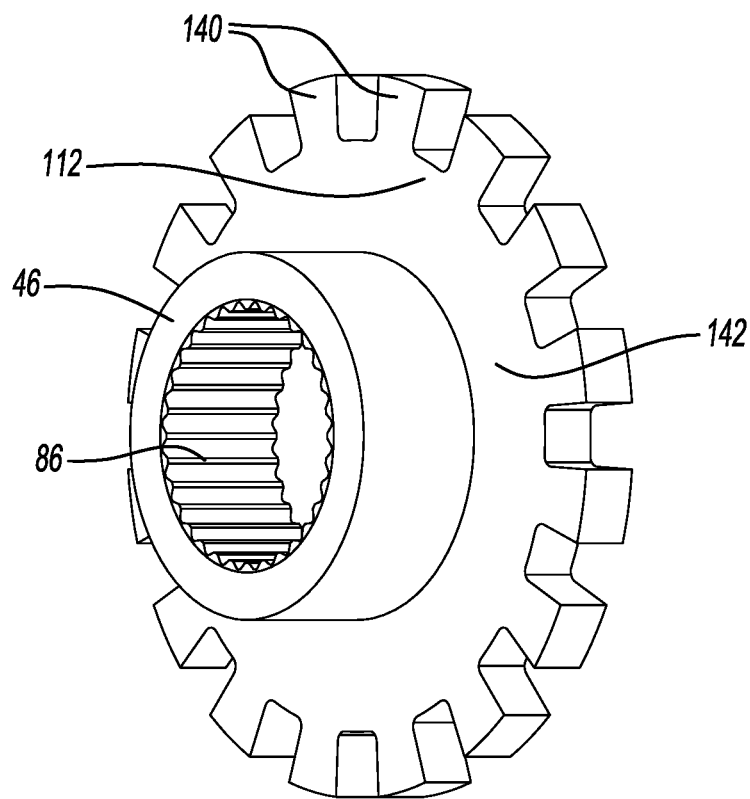
FIG. 9 is a perspective view of a portion of the disconnecting differential assembly, the view illustrating a portion of the second disconnect clutch that is rotatably coupled to a differential output.
Figure 10:
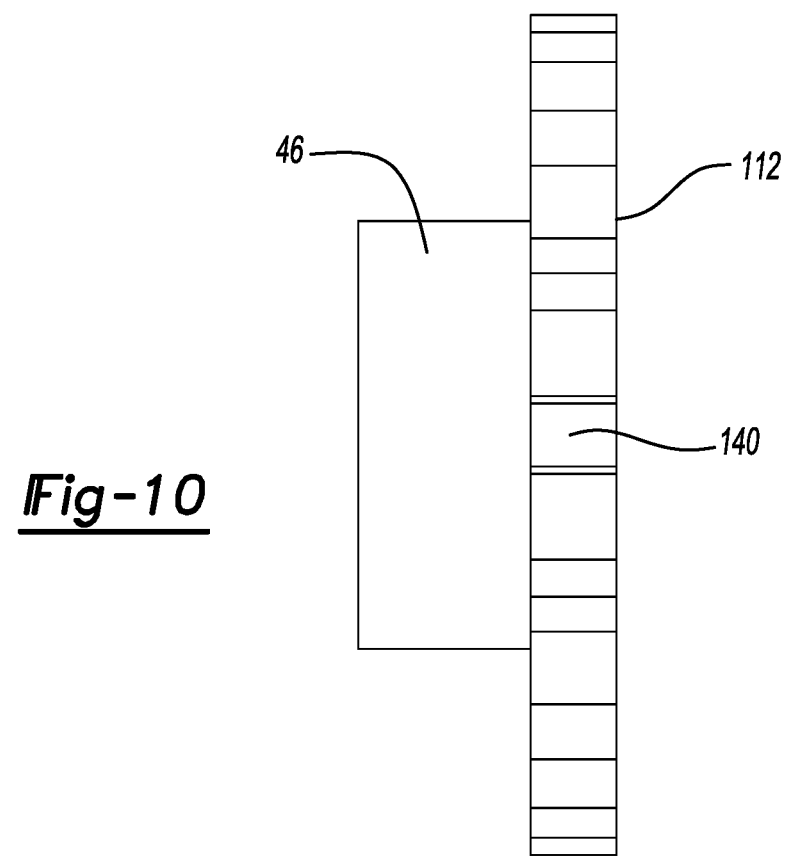
FIG. 10 is a side elevation view of the differential output and portion of the second disconnect clutch that is depicted in FIG. 9.

With reference to FIGS. 2, 9 and 10, the fourth dog 112 can be fixedly coupled to the second differential output 46 and can include a plurality of second teeth 140 that are configured to matingly engage with the dog teeth 128 (FIG. 5) on the dog ring 120. In the example provided, the fourth dog 112 is an annular flange 142 that projects radially outwardly from the second differential output 46 and the second teeth 140 project radially outwardly from the annular flange 142. If desired, the dog teeth 128 (FIG. 5) and the second teeth 140 could be formed with a predetermined amount of back-taper (e.g., 1.5 degrees per side) to permit the dog teeth 128 (FIG. 5) and the second teeth 140 to more readily engage one another.

As shown in FIG. 2, the second return spring 114 can be disposed between the dog ring 120 and a second axial end 150 of the differential case 54. In the example provided, the second return spring 114 is a wave spring that is received into an annular groove 152 formed into the differential case 54. The second return spring 114 can bias the dog ring 120 away from the second differential output 46.

The actuator 24 is configured to simultaneously control the operation of the first and second disconnect clutches 48 and 50 and can include a linear motor 160, a set of first thrust elements 162 and a set of second thrust elements 164. The linear motor 160 has a motor output 170 that is configured to move the set of first thrust elements 162 and the set of second thrust elements 164. In the example provided, the linear motor 160 is a conventional solenoid having an electromagnet 180, an armature 182 and a plunger 184, but it will be appreciated that other types of linear motors, including hydraulic or pneumatic cylinder, and moreover that the solenoid could have a bi-stable configuration that permits the solenoid to be maintained a desired condition (i.e., extended or retracted) without the need for constant electrical power. The solenoid can be received on an external circumferentially extending surface 190 proximate the first axial end 102 of the differential case 54. A bushing 192 can be disposed between the electromagnet 180 and the differential case 54 to permit relative rotation between the solenoid and the differential case 54. An external snap ring 196 can be received into a groove 198 formed into the differential case 54 and can limit movement of the solenoid along the differential axis 32 in a direction away from the first axial end 102 of the differential case 54. The armature 182 can be coupled to (e.g., unitarily and integrally formed with) the first axial end 102 of the differential case 54. The plunger 184, which is fixedly coupled to the electromagnet 180 in the example provided, is the motor output 170 of the linear motor 160 in the example provided. The plunger 184 can be disposed along the differential axis 32 between the first axial end 102 of the differential case 54 and the electromagnet 180. It will be appreciated that operation of the electromagnet 180 will cause corresponding translation of the electromagnet 180 and the plunger 184 along the differential axis 32. It will be appreciated, however, that the solenoid could be configured such that the armature 182 is formed separately from the differential case 54 and the plunger 184 and the armature 182 are coupled to one another for movement along the differential axis 32 relative to the electromagnet 180.

With reference to FIGS. 2 and 3, the set of first thrust elements 162 can be disposed between the motor output 170 (i.e., the plunger 184 in the example provided) and the second dog 92, while the set of second thrust elements 164 can be disposed between the motor output 170 and the dog ring 120. The set of first thrust elements 162 can include a plurality of first pins that are received through the first axial end 102 of the differential case 54. The first pins are disposed in a first load transmission path between the plunger 184 and the second dog 92. The set of second thrust elements 164 can include a plurality of second pins that are received through the first axial end 102 of the differential case 54 radially outwardly of the first pins. The second pins are disposed in a second load transmission path between the plunger 184 and the dog ring 120.

In operation of the vehicle driveline component 10, the first return spring 94 biases the second dog 92 out of engagement with the first dog 90 (as shown in FIG. 2), and the second return spring 114 biases the dog ring 120 out of engagement with the fourth dog 112 (as shown in FIG. 2) to thereby decouple the first and second differential outputs 44 and 46 from the first and second gearset outputs 70 and 72. In this condition, both of the drive wheels are rotationally decoupled from the differential gearset 42 and consequently, none of the components of the differential gearset 42 (i.e., the first and second side gears 78 and 80 and the differential pinions 76) is back-driven by the drive wheels so that improved fuel economy can be provided. It will be appreciated that force exerted by the first and second return springs 94 and 114 urges the first and second thrust elements 162 and 164 along the differential axis 32 away from the first dog 90 such that the electromagnet 180 is abutted against the external snap ring 196.

With reference to FIGS. 3 and 11, electrical energy can be provided to the electromagnet 180 to cause the electromagnet 180 (and the plunger 184) to travel along the differential axis 32 toward the first axial end 102 of the differential case 54. Movement of the plunger 184 in this manner causes corresponding movement of the first and second thrust elements 162 and 164, which drive the second dog 92 and the dog ring 120, respectively, into engagement with the first dog 90 and the fourth dog 112, respectively, as is shown in FIG. 11. Engagement of the first and second dogs 90 and 92 with one another provides a power path between the first gearset output 70 (i.e., the first side gear 78 in the example provided) and the first differential output 44 through which rotary power can be transmitted. Similarly, engagement of the dog ring 120 with the fourth dog 112 provides a power path between the second gearset output 72 (i.e., the second side gear 80 in the example provided) and the second differential output 46 through which rotary power can be transmitted.

Accordingly, a vehicle driveline component for a disconnecting all-wheel drive driveline having a relatively compact and inexpensive differential assembly that is configured to disconnect both of the drive wheels from a differential gearset is provided.

With reference to FIG. 12, the vehicle driveline component 10 is illustrated as being a rear axle assembly in an all-wheel drive driveline AWDD. In this example, a powertrain PT, having an internal combustion engine ICE and a transmission T, provides rotary power to a front axle assembly FAA that is driven on a full-time basis. A power take-off unit PTU is employed to selectively transmit rotary power to the rear axle assembly via a rear propshaft RP.

With reference to FIG. 13, the vehicle driveline component 10 is illustrated as being a front axle assembly in a four-wheel drive driveline 4WDD. In this example, a powertrain PT, having an internal combustion engine ICE and a transmission T, provides rotary power to a transfer case TC. The transfer case TC provides rotary power to a rear axle assembly RAA via a rear propshaft RP to drive the rear axle assembly RAA on a full-time basis. The transfer case TC is also coupled the front axle assembly via a front propshaft FP. The transfer case TC includes a clutch (not specifically shown) that permits selective transmission of rotary power to the front axle assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline comprising:
a differential case that is rotatable about a differential axis;
a differential gearset received in and driven by the differential case, the differential gearset having a first gearset output and a second gearset output that are rotatable about the differential axis;
first and second differential outputs that are received in the differential case and rotatable about the differential axis;
a first disconnect clutch that is disposed in the differential case and selectively couples the first differential output to the first gearset output; and
a second disconnect clutch that is disposed in the differential case and selectively couples the second differential output to the second gearset output.

2. The vehicle driveline of claim 1, wherein the first and second differential outputs are side gears that are received in the differential case.

3. The vehicle driveline of claim 2, wherein the differential gearset further comprises a plurality of differential pinions, each of the differential pinions being rotatable relative to the differential case and meshingly engaged to at least one of the first and second gearset outputs.

4. The vehicle driveline of claim 3, wherein the differential gearset is a straight bevel gearset.

5. The vehicle driveline of claim 1, wherein the first disconnect clutch is a first dog clutch.

6. The vehicle driveline of claim 5, wherein the first dog clutch includes a first dog, which is fixedly coupled to the first gearset output, and a second dog that is fixedly coupled to the first differential output.

7. The vehicle driveline of claim 6, wherein a first return spring is disposed between the first and second dogs.

8. The vehicle driveline of claim 6, wherein the second disconnect clutch is a second dog clutch having a third dog and a fourth dog, wherein the third dog is non-rotatably but axially slidably coupled to the second gearset output and wherein the fourth dog is fixedly coupled to the second differential output.

9. The vehicle driveline of claim 8, further comprising a return spring disposed between the differential case and the first dog.

10. A vehicle driveline comprising:
a differential input that is rotatable about a differential axis;
a differential gearset driven by the differential input, the differential gearset having a first gearset output and a second gearset output that are rotatable about the differential axis;
first and second differential outputs that are rotatable about the differential axis;
a first disconnect clutch that selectively couples the first differential output to the first gearset output, wherein the first disconnect clutch is a first dog clutch that includes a first dog, which is fixedly coupled to the first gearset output, and a second dog that is fixedly coupled to the first differential output;
a second disconnect clutch that selectively couples the second differential output to the second gearset output, the second disconnect clutch being a second dog clutch having a third dog and a fourth dog, wherein the third dog is non-rotatably but axially slidably coupled to the second gearset output and wherein the fourth dog is fixedly coupled to the second differential output; and
an actuator for controlling operation of the first and second disconnect clutches, the actuator having a linear motor, a set of first thrust elements, and a set of second thrust elements, the linear motor having a motor output, the set of first thrust elements being disposed between the motor output and the first dog, the set of second thrust elements being disposed between the motor output and the third dog.

11. The vehicle driveline of claim 10, wherein the differential input comprises a differential case, wherein the set of first thrust elements comprises a plurality of first pins that are received through a first axial end of the differential case, and wherein the set of second thrust elements comprises a plurality of second pins that are received through the first axial end of the differential case.

12. The vehicle driveline of claim 11, wherein the linear motor comprises a solenoid that is rotatably disposed on a circumferentially extending surface formed on the differential case.

13. The vehicle driveline of claim 1, further comprising:
a housing that supports the differential case for rotation about the differential axis;
a ring gear fixedly coupled to the differential case; and
a pinion gear meshed with the ring gear, the pinion gear being rotatable about a pinion axis that is transverse to the differential axis.

14. The vehicle driveline of claim 13, further comprising:
a transfer case; and
a propshaft coupling an output of the transfer case to the pinion gear.

15. The vehicle driveline of claim 13, further comprising:
a power take-off unit; and
a propshaft coupling an output of the power take-off unit to the pinion gear.

16. A vehicle driveline comprising:
a housing;
an input pinion received in the housing and rotatable about a pinion axis;
a ring gear meshed with the input pinion and rotatable about a differential axis that is transverse to the differential axis;
a differential assembly having a differential case, a plurality of differential pinions, first and second side gears, first and second output members, a first disconnect clutch and a second disconnect clutch, the differential case being coupled to the ring gear for rotation therewith, the differential case defining a cavity, the differential pinions being received in the cavity and being rotatably coupled to the differential case, the first and second side gears being received in the cavity and meshingly engaged to the differential pinions, the first and second side gears being rotatable about the differential axis, the first output member being received in the cavity and disposed between a first axial end of the differential case and the first side gear, the second output member being received in the cavity and disposed between a second, opposite axial end of the differential case and the second side gear, wherein the first and second side gears are received between the first and second outputs, the first disconnect clutch having a first dog, which is fixedly coupled to the first side gear, a second dog, which is fixedly coupled to the first output member, and a first biasing spring that biases the second dog along the differential axis away from the first dog, the second disconnect clutch having a third dog, which is non-rotatably but axially slidably coupled to the second side gear, a fourth dog, which is fixedly coupled to the second output, and a second biasing spring that biases the third dog along the differential axis away from the fourth dog; and
an actuator having an electromagnet, a plunger, a plurality of first pins, and a plurality of second pins, the electromagnet being rotatably disposed on an exterior surface of the differential case, the plunger being received on the exterior surface of the differential case and being disposed axially along the differential axis between the first axial end of the differential case and the electromagnet, the first pins extending through the first end of the differential case and being disposed in a first load transmission path between the plunger and the second dog, the second pins extending through the first end of the differential case radially outwardly of the first pins, the second pins being disposed in a second load transmission path between the plunger and the third dog;
wherein operation of the electromagnet to move the plunger along the differential axis toward the first axial end of the differential case causes corresponding movement of the first and second pins to thereby engage the second dog to the first dog, and to engage the third dog to the fourth dog.

17. The vehicle driveline of claim 16, further comparing first and second shafts, the first shaft being received into the differential case and being non-rotatably coupled to the first output member, the second shaft being received into the differential case and being non-rotatably coupled to the second output.

18. The vehicle driveline of claim 1, wherein the first disconnect clutch is a first dog clutch that includes a first dog, which is fixedly coupled to the first gearset output, and a second dog that is fixedly coupled to the first differential output.

19. The vehicle driveline of claim 18, wherein the second disconnect clutch is a second dog clutch having a third dog and a fourth dog, wherein the third dog is non-rotatably but axially slidably coupled to the second gearset output and wherein the fourth dog is fixedly coupled to the second differential output.

20. The vehicle driveline of claim 19, further comprising an actuator for controlling operation of the first and second disconnect clutches, the actuator having a linear motor, a set of first thrust elements, and a set of second thrust elements, the linear motor having a motor output, the set of first thrust elements being disposed between the motor output and the first dog, the set of second thrust elements being disposed between the motor output and the third dog.

* * * * *